Figure 1:
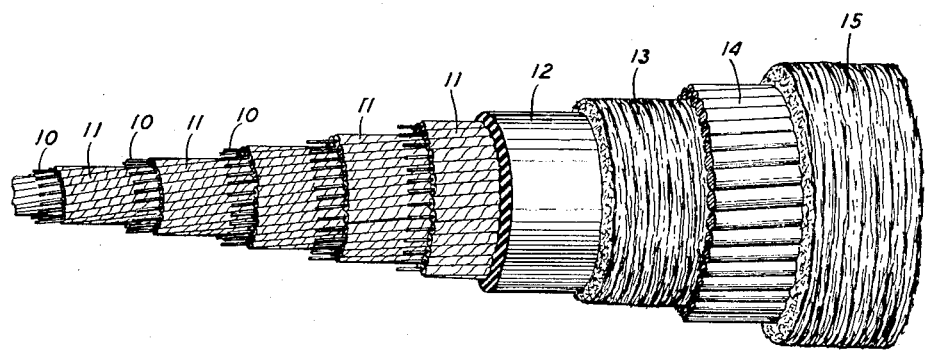

March 27, 1934.                F. B. LIVINGSTON                1,952,875
                              MULTICONDUCTOR CABLE
                              Filed Aug. 30, 1930

INVENTOR
F. B. LIVINGSTON
BY
ATTORNEY

Patented Mar. 27, 1934

1,952,875

UNITED STATES PATENT OFFICE 1,952,875

MULTICONDUCTOR CABLE

Frank B. Livingston, Bogota, N. J., assignor to Bell Telephone Laboratories, Incorporated, New York, N. Y., a corporation of New York Application August 30, 1930, Serial No. 478,846

5 Claims. (Cl. 173—266)

This invention relates to multi-conductor cables and particularly to signaling cables of this type which have an outer armoring of metal wires or bands.

An object of the invention is to reduce or eliminate strains in the insulated conductors and the possibility of breakage during the laying operation when such cables are subjected to bending and unbending.

Another object of the invention is to reduce under these conditions, relative shifting of adjacent layers of conductors and the consequent impairment of the insulation and disturbance of the electrical characteristics of the individual conductors.

In accordance with general practice in the manufacture of telephone cables, the conductors are arranged in concentric layers with opposite direction of lay in alternate layers. The conductors have been enclosed in a sheath of lead and in certain instances, a layer of armor wires has been placed on the outside of the sheathed core. This type of construction has particularly found use in telephone cables laid under water. The outer armoring has been applied with a certain direction of lay and it has been found that during the laying operation, when, for example, the cable is being paid out over a sheave into the water, there may be a considerable pull on the cable which is mainly taken up by the armor wires. Especially in the bend in the cable over the sheave this pull has a tendency to produce a partial uncoiling of the layer of armor wires, that is, a straightening of the individual wires. This slight unwinding of the armoring applies a twisting force to the cable core in a direction opposite that of the lay of the armoring, which in turn would effect a loosening of those conductors which have the same direction of lay as the armor wires and a tightening of those having a lay in the opposite direction. Under certain conditions the tightening of the conductors in alternate layers may be so severe that the insulation on individual conductors is ruptured or even some of the conductors broken. The loosening of alternate layers would result in an effective lengthening of the conductors in such layers and the tightening of the other layers would result in an effective shortening of those conductors so that in general there will be an undesirable relative shifting between alternate layers which is likely to impair their insulation and at the same time would modify in different ways the electrical characteristics of the conductors.

It has furthermore been customary to provide so-called plugs in cables of this type for the purpose of localizing the effect of leaks in the cable sheath. For this purpose an impregnating material has been used to fill interstices between the conductors in order to provide a water-tight seal between adjoining sections of cable. At ordinary temperatures, such impregnating material would be in a solid state and a relative shifting between alternate layers of conductors would have a tendency to break up the solid seal which consequently would become defective. These detrimental effects would be still more pronounced in a cable filled throughout its length with impregnating material.

In accordance with this invention and for the stated objects, the conductors are placed in layers all of which have a direction of lay the same as that of the armoring.

In accordance with a special feature of the invention, the pitch of the lay for any one layer is chosen with respect to the position of the layer relative to the armoring so that the lengthening of the various layers due to the uncoiling of the armoring will be substantially equal, thereby tending to reduce the relative shift between adjacent layers.

It is within the scope of the invention, however, that in such regions within the core of conductors where the disturbances due to the uncoiling of the armoring is nearly negligible, the prior method of alternating the lay of adjacent layers may be adhered to, whereas in other regions where the disturbances are more serious, the layers may all be applied with the same direction of lay as that of the armor wires, and of the latter layers those which are particularly subject to strain may be applied with varying pitch according to their depth below the armoring.

Figure 2:
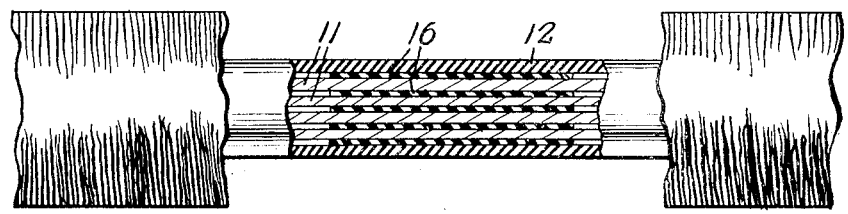

In the accompanying drawing, Fig. 1 illustrates a portion of a multi-conductor cable in accordance with the invention in which several layers have been bared for the sake of illustration, and, Fig. 2 shows schematically a portion of the cable shown in Fig. 1 with parts removed to show a sectionalizing plug.

In the embodiment of the invention shown in Fig. 1 the conductors 10 are each surrounded by paper insulation 11 and are placed in successive concentric layers forming the multi-conductor core. The core is surrounded by a water-proof sheath 12, such as a lead sheath, which in turn is protected by a layer of hemp 13 which also forms a bedding for the steel armor wires 14 which in turn are covered by another layer of hemp 15.

As shown in Fig. 2, the division of the cable into sections for the purpose of localizing the effects of leaks may be accomplished by filling the interstices between the conductors 11 inside the sheath 12 with an impregnating material 16 in any well known manner for a short distance thereby preventing water in one section from entering another section.

The lay of all the conductors in the layers shown is in the same direction as that of the armor wires and the pitch of the lay increases as the layers approach the surface of the cable, the pitch of the outermost layer being more nearly equal to the pitch of the armoring than is the pitch of any of the other layers.

What is claimed is:

1. In a multi-conductor signaling cable subject to twisting having a helically applied metallic armoring and having the conductors applied in concentric layers, having a water-tight sheath enclosing said conductors and also having between two adjoining sections a water-tight seal of solid impregnating material, the arrangement according to which a plurality of adjacent layers of conductors are applied with the same direction of lay as the armoring to minimize the tendency of said conductors to break said seal when said cable is bent or unbent.

2. In a multi-conductor lead sheathed, signaling cable subject to twisting having a leak-localizing filling of solid impregnating material inside the lead sheath, and having a helically applied metallic armoring and having the conductors applied in concentric layers, the arrangement according to which all of said concentric layers of conductors are applied with the same direction of lay as the armoring.

3. In a multi-conductor signaling cable, in accordance with claim 1, the arrangement according to which each of the said adjacent layers is applied with a length of lay in such proportion to that of the armoring that relative longitudinal shifting of said layers caused by twisting of the cable is substantially reduced.

4. In a multi-conductor signaling cable, in accordance with claim 1, the arrangement according to which each of the said adjacent layers is applied with a length of lay proportioned to that of the armoring in accordance with the depth of each particular layer below the armoring.

5. A multi-conductor submarine cable, subject to twisting, consisting of paper insulated conductors arranged in layers, a sheath of metallic water-proof material enclosing the conductors, a plurality of plugs for dividing the cable into sections by forming water-tight seals of solid impregnating material filling the interstices inside said sheath, a layer of protective material over the sheath, armoring wires helically applied thereon, a layer of protective material over the armoring wires, a plurality of adjacent layers of said conductors having the same direction of lay as the armoring wires to reduce strain on said plugs when said cable is bent or unbent.

FRANK B. LIVINGSTON.